Oct. 20, 1970 R. F. BENTLEY ET AL Re. 26,970

METHOD AND APPARATUS FOR TRANSLATING CUTTING TOOL MOVEMENT

Original Filed July 25, 1961

INVENTORS
Robert F. Bentley &
BY Sam V. Simonetti
Hugh L. Fisher
ATTORNEY

United States Patent Office

Re. 26,970
Reissued Oct. 20, 1970

26,970

METHOD AND APPARATUS FOR TRANSLATING CUTTING TOOL MOVEMENT

Robert F. Bentley, Hudson, Ohio, and Sam V. Simonetti, Harper Woods, Mich., assignors to General Motors Corporation, Detroit, Mich., a corporation of Delaware Original No. 3,135,852, dated June 2, 1964, Ser. No. 126,624, July 25, 1961. Application for reissue Mar. 7, 1966, Ser. No. 534,622

Int. Cl. B23p *1/08, 1/12*

U.S. Cl. 219—69 21 Claims

Matter enclosed in heavy brackets [ ] appears in the original patent but forms no part of this reissue specification; matter printed in italics indicates the additions made by reissue.

ABSTRACT OF THE DISCLOSURE

*To effect translatory movement between an electro-erosion machining electrode and a workpiece, a rotating input is eccentrically mounted to drive the electrode in an orbital path, and a sliding yoke is connected with the electrode to prevent electrode rotation and allow electrode translation.*

This invention relates generally to machine tools and particularly to a device for correlating movements between a cutting tool and workpiece. The device is adapted for use, although not exclusively, with electrical stock removal apparatus.

The machining of noncircular contours and tapers with a rotary power source presents the problem of correlating relative movements between the cutting tool and the workpiece in order to achieve the desired result. One example of this occurs with the well known process employing the electrical stock removal apparatus and commonly referred as to Electrical Discharge Machining. In this process a series of electrical discharges are generated across an ionizable fluid-filled gap formed between cutting tool and workpiece electrodes. These electrical discharges cause stock to be eroded from the workpiece electrode in accordance with a certain scheme usually determined by the contour of the cutting tool electrode. The process has been found to be very advantageous in the machining of irregular configurations in hardened materials, such as used for dies and punches. But the process does present problems when close dimensional control is demanded, for the cutting tool electrode normally wears in a way that produces a taper, which may be objectionable, on the workpiece electrode as the machining takes place. Also, if for some reason it is desired to alter the size of a machined surface, the cutting tool electrode used to machine in the first instance often cannot be reused, but an entirely new cutting tool electrode is required for the new dimensions. Moreover, if a specific taper is needed, e.g., a certain draft angle may be required, the taper due to the normal wear of the cutting tool electrode complicates the problem.

Accordingly, the invention contemplates a novel mechanism for converting the rotary movement of a power source into relative translatory movement between a cutting tool and a workpiece. Specifically, the arrangement produces oscillatory movement in all directions. This permits an oversize female cutting tool to be utilized for machining of a male workpiece to a smaller size. Similarly, an undersize male cutting tool may be employed to increase the dimensions of a female workpiece.

The invention further contemplates provision of a unique system that enables a certain taper to be machined or the sides of a machined surface to be made relatively straight.

More particularly, the invention seeks to adapt the foregoing system for use with the EDM process by converting the rotary motion of a power source into translatory movement of one of the electrodes such that oversize female cutting tool electrodes and undersize male cutting tool electrodes can be utilized respectively to machine male and female workpiece electrodes to accurate size while permitting the sides of the surfaces machined in a workpiece electrode to be tapered or made straight.

Another aim of the invention is the provision of a novel control system for enabling synchronism of the relative movement between a cutting tool and a workpiece to facilitate the generation of different types of surfaces and shapes.

The foregoing and other objects and advantages of the invention will be apparent from the following description and the accompanying drawings in which.

Figure 4:
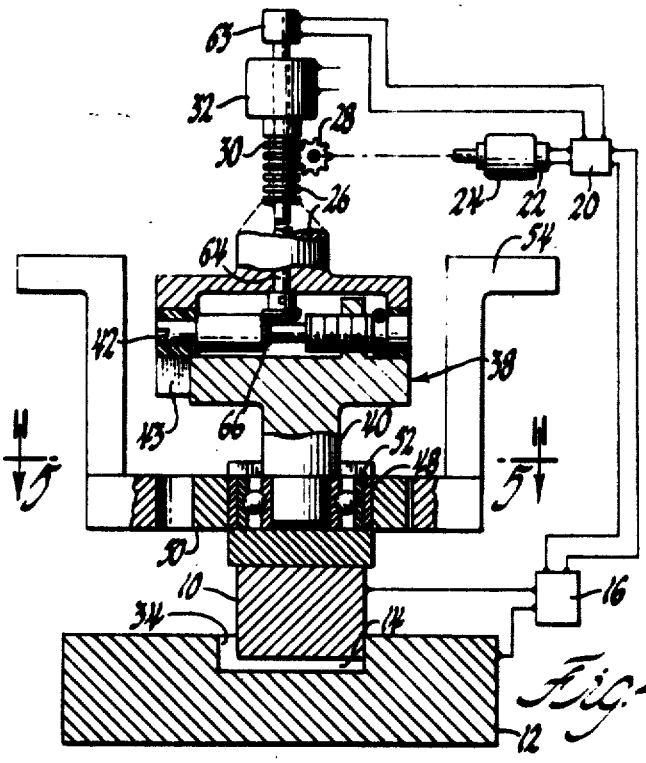
FIG. 4 is a schematic view of a control system for operating the EDM apparatus utilized to demonstrate the invention.

Referring to the drawings in detail and initially to FIG. 4, the electrical stock removal apparatus illustrated includes a cutting tool 10 and a workpiece 12. The cutting tool 10 and the workpiece 12 as well as the generation of time spaced electrical discharges across a gap 14 formed therebetween may be accomplished in any well known way, such as that explained in the U.S. application Ser. No. 832,345 to Colten et al., filed Aug. 7, 1959, and entitled "Electrical Discharge Machining Apparatus."

Because of this prior disclosure, this aspect will only be sufficiently detailed to facilitate an understanding of the invention. Briefly, a power supply denoted generally at 16 generates the electrical stock removing discharges across a gap 14, these discharges taking place in the presence of a suitable dielectric fluid. The voltage across the gap 14 is sensed by a control circuit 20 where it is compared with a reference voltage corresponding to the desired gap spacing. If there is a difference between the gap voltage and the reference voltage, the control circuit 20 will produce a corresponding output signal. This output signal is employed by a force motor 22 for controlling a servomotor 24. The servomotor 24 can be of the rotary fluid pressure operated kind and will cause a spindle 26 having the cutting tool 10 drive connected thereto to be moved upwardly or downwardly through the agency of a gear 28 that engages a rack 30 formed on the spindle 26. The spindle 26 is also revolved by an appropriate motor 32 at selected speeds, which may be established by adjusting the motor 32 in any known way.

With the foregoing arrangement, any time the actual gap voltage varies from the predetermined reference gap voltage a correction in the gap spacing is made in order to achieve the optimum cutting gap. Also, if preferred, the workpiece 12 can be moved and the cutting tool maintained stationary. This movement of the workpiece 12 would be by the same type of mechanism, or both the cutting tool 10 and the workpiece 12 can be individually maneuvered.

Very often is is found necessary to machine an opening 34 in the workpiece 12 of a larger dimension than the cutting tool 10. This may be because the cutting tool 10 is unintentionally made undersize, or it is preferred to use a smaller electrode because of the expense of the material, or it is wanted to reuse an electrode rather than prepare a new one. Normally, an electrode will make a certain size opening. If subsequently, the size of the opening is to be increased, the past practice has demanded that a new oversize electrode be made. For instance, if the opening 34 is to have the configuration displayed by the broken line in FIG. 1, and the cutting tool 10 has the size and the shape shown by the solid line 36, it can be appreciated that there is a significant difference in the sizes of the opening 34 and the size of the cutting tool 10.

To cut the opening 34 this amount oversize, the rotary motion of the spindle 26 is converted into translatory movement of a motion converting mechanism denoted generally by the numeral 38. This translatory movement is defined as that motion in which all the points of a moving body have at any instant the same velocity and direction of motion as distinguished from rotation. The mechanism for accomplishing this conversion includes an offset element as crank 40 appropriately drive connected to the spindle 26. The axis of rotation of the crank 40 can be made eccentric relative to the axis of rotation of the spindle 26 by a screw 42 revolvably supported at the ends thereof by the spindle 26 and having mounted thereon the crank 40. Rotation of the screw 42 will cause the crank 40 to slide along a rotation inhibiting slot 43 as viewed in FIG. 4. This sliding movement, as observed in FIG. 4, will be either to the left or to the right, a predetermined extent, determined by the offset wanted.

Figure 1:
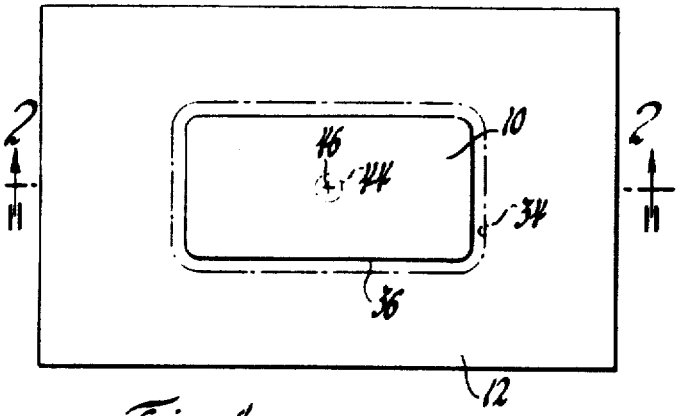
FIG. 1 is a plan view of two electrodes employed by EDM apparatus incorporating the principles of the invention.

For purposes of demonstration, it will be assumed that the axis of the crank 40 traverses the circle 44 shown in FIG. 1, the point 46 being the center of rotation of the spindle 26. This rotary motion of the crank 40 is transferred to the cutting tool 10 through primary and secondary slides 48 and 50 and a roller bearing 52 interposed between the crank 40 and the primary slide 48. As best observed in FIG. 5, rotation of the crank 40 will, because of the roller bearing 52, cause the primary slide 48 to which is connected the cutting tool 10, to also attempt to revolve. Because of the secondary slide 50, which is slidably mounted in a fixed bracket 54, the cutting tool 10 can only move left and right or up and down from the FIG. 5 position. The combination of these movements will cause the cutting tool 10 to machine to the broken line in FIG. 1 as long as the radius of the offset circle 44 is set for this extent of overcut.

Figure 3:
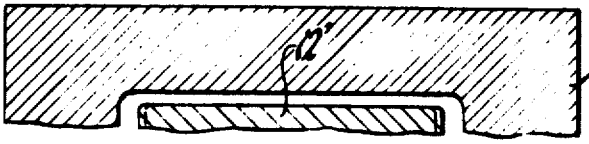
FIG. 3 is a sectional view somewhat similar to FIG. 2 except that the cutting tool electrode is the female member.
Figure 5:
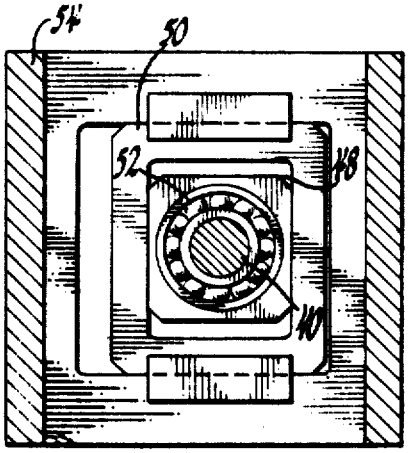
FIG. 5 is a view of the apparatus taken along line 5—5 of FIG. 4.

If instead of an opening 34, it is now desired to machine a workpiece 12' so as to form a protrusion on a punch or the like, such as in FIG. 3, the cutting tool 10' is utilized and the travel thereof is caused by the mechanism 38 to be in the same directions mentioned in describing FIG. 5. The amount of travel will be that required to machine to the broken line on the workpiece 12' and this will correspond to the radius or amount of offset of the crank 40.

Figure 6:
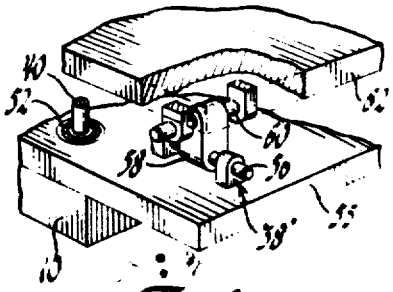
FIG. 6 is a view of a modification.
Figure 2:
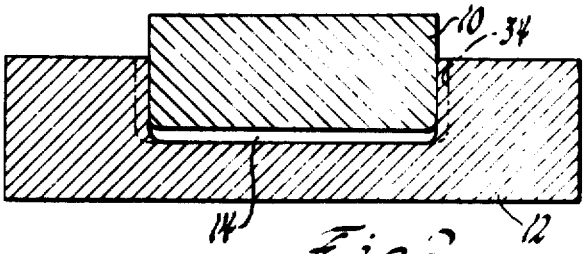
FIG. 2 is a sectional view taken along line 2—2 of FIG. 1.

In FIG. 6, a modified motion converting mechanism 38' is depicted for producing the translatory movement of the cutting tool 10. A plate 55 may have the cutting tool 10 suitably joined thereto and may also have the bearing 52 therein for receiving the crank 40. A shaft 56 is mounted on the plate 55 and has slidable thereon one end of link 58. At the opposite end, the link 58 is slidably joined to a cross shaft 60 extending normal to the direction of the shaft 56 and secured to a fixed frame 62. If preferred, the cross shafts 56 and 60 can be slidable and have the link 58 fixed thereon or a combination thereof. Also, as those skilled in the art will appreciate, appropriate sliding ways (not shown) may be employed for moving the plate 55 and the fixed frame 62 relative to each other. One or more of these mechanisms 38' may be employed. As with the coaction between the primary and secondary slides 48 and 50 in the FIG. 4, embodiment, the cutting tool 10 can only travel in two coordinate directions that are normal relative to each other. Hence, the cutting tool 10 cannot rotate with the crank 40 but is required to have the previously referred to translatory motion.

From the foregoing, it can be appreciated that with the mechanisms 38 and 38', either an undersized male cutting tool 10 can be utilized to machine an opening in a workpiece or an oversize female cutting 10' can be employed to machine a punch or the like. Moreover, noncircular configurations can be formed while employing a rotating power source.

Another significant feature of the FIG. 4 apparatus is the provision for machining in different ways. First, if wanted, the cutting tool 10 can be fed into the workpiece 12 the desired depth without any translatory movement merely by setting the crank 40 so as to have a zero eccentricity relative to the spindle 26. In other words, the crank 40 and the spindle 26 have no offset but are coaxial or axially aligned. When at the desired depth, the offset can be established and the oscillatory movement of the cutting tool 10 commenced without any change in the actual positions of the cutting tool 10 and workpiece 12. The opening 34 is then cut to the desired size, the cutting taking place along the sides of the opening 34. By dressing the sides of the cutting tool 10 so as to make them straight, the movement of the cutting tool 10 into the sides of the opening 34 will insure that straight sides are generated.

Second, the desired offset can be established and the translatory motion of the cutting tool 10 caused to take place at the same time as the cutting tool 10 is fed into the workpiece 12. In this application, the feeding of the cutting tool 10 by servomotor 24 and the rotation of the spindle 26 by the motor 32 is coordinated or synchronized by appropriately adjusting the speeds for the best results.

Third, the sides of the opening 34 can be tapered to any desired amount by adjusting the offset as the cutting tool 10 is fed into the workpiece 12. The changing of the offset can be done manually by rotating the screw 42 or automatically through a variable speed motor 63 that rotates a screw shaft 64 carried inside the spindle 26 and made movable with the spindle 26. The motor 63 will through bevel gearing 66 cause the screw 42 to be turned and the offset of the crank 40 changed. The operation of the motor 63 may be controlled by the control circuit 20 in any suitable way so as to commence the rotation thereof at an appropriate speed and at the same time as operation of the control circuit 20 commences to initiate the feed of the spindle 26 and accordingly the cutting tool 10 towards the workpiece 12.

The invention is to be limited only by the following claims.

We claim:

[1. In combination, a cutting tool member for machining a workpiece member, means feeding the members relative to each other, a rotating driver, and means converting the rotary movement of the driver into translatory movement of one of the members relative to the other, the translatory movement being in a plane transverse to the direction of relative movement between the members.]

[2. In combination, a cutting tool member for machining a workpiece member, a rotating driver, and means converting the rotary movement of the driver into translatory movement of one of the members relative to the other so as to generate a noncircular pattern.]

3. In combination, a cutting tool member for machining a workpiece member, a rotating input arranged to revolve about an offset axis, means drive connecting the input to one of the members, and means preventing rotation of the one member so that the one member has translatory movement about the offset axis.

4. In combination, a cutting tool member for machining a workpiece member, an input revolvable about a certain axis, an output drive connected to the input and revolvable about an axis offset relative to the axis of the input, means connecting the output to one of the members, and means preventing rotation of the one member so that the one member is caused to have translatory movement about the offset axis.

5. In combination, a cutting tool member for machining a workpiece member, a rotating driver, and means converting the rotary movement of the driver into translatory movement of one of the members, the rotary movement converting means including means mounting the one member for movement in two coordinate directions.

6. In combination, a cutting tool member for machining a workpiece member, a rotating input, an offset element revolvable by the input about an axis eccentric to the rotary axis of the input, and means converting the rotary movement of the offset element into translatory movement of one of the members, the rotary movement converting means including a revolvable connection between the one member and the offset element and means mounting the one member for movement in two coordinate directions.

7. In combination, a cutting tool member for machining a workpiece member, a rotating input, an offset element revolvable by the input about an axis eccentric to the rotary axis of the input, and means converting the rotary movement of the offset element into translatory movement of one of the members, the rotary movement converting means including a bearing connection between the offset element and the one member, first means slidably mounting the one member for movement in one direction and second means slidably mounting the one member for movement in a direction transverse to the movement of the first means.

8. In combination, a cutting tool member for machining a workpiece member, a rotating driver, means feeding the members relative to each other, an offset element revolvable by the driver about an axis eccentric to the axis of rotation of the driver, means adjusting the eccentricity, and means converting the rotary movement of the offset element into translatory movement of one of the members, the translatory movement being in a plane transverse to the direction of relative movement between the members.

9. In combination, a female cutting tool member for machining a male workpiece member, a driver revolvable about an axis, an offset element revolvable by the driver about an axis eccentric to the axis of rotation of the driver, and means converting the rotary movement of the offset element into translatory movement of one of the members, the rotary movement converting means including a bearing connection between the offset element and the one member and a pair of slides mounting the one member for shiftable movement in coordinate directions.

10. In combination, a male cutting tool member for machining a female workpiece member, a driver revolvable about an axis, an offset element revolvable by the driver about an axis eccentric to the axis of rotation of the driver, and means converting the rotary movement of the offset element into translatory movement of one of the members, the rotary movement converting means including a bearing connection between the offset element and the one member and a pair of slides mounting the one member for shiftable movement in coordinate directions.

11. In combination, a cutting tool member for machining a workpiece member, a driver revolvable about the axis thereof, an offset element revolvable by the driver about an axis eccentric to the axis of the driver, means altering the position of the eccentric axis relative to the axis of the driver, and means converting the rotary movement of the offset element into translatory movement of one of the members so as to cause a certain configuration to be machined in the workpiece member, the rotary movement converting means including a bearing connection between the offset element and the one member and a pair of slides mounting the one member for shiftable movement in coordinate directions.

12. In combination, a cutting tool member for machining a workpiece member, means feeding the members relative to each other, a rotating driver, means converting the rotary motion of the driver into translatory movement of one of the members relative to the other member, means altering the translatory movement of the one member, and means coordinating the operation of the feeding means and the altering means so as to produce a predetermined taper.

13. In electrical stock removal apparatus of a character in which electrical discharges are generated across an ionizable fluid filled gap formed between cutting tool and workpiece electrodes so as to erode material from the workpiece electrode, the combination comprising a rotating driver, means feeding the electrodes relative to each other, and means converting the rotary movement of the driver into translatory movement of one of the electrodes relative to the other of the electrodes, the translatory movement being in a plane transverse to the direction of relative movement between the electrodes.

14. In electrical stock removal apparatus of the character in which electrical discharges are generated across an ionizable fluid filled gap formed between cutting tool and workpiece electrodes so as to erode material from the workpiece electrode comprising a rotating driver, an offset element revolvable by the driver about an axis eccentric to the axis of rotation of the driver, and means converting the rotary movement of the offset into translatory movement of the one of the electrodes, the rotary motion converting means including a revolvable connection between the offset element and the one electrode and slide means mounting the one electrode for movement in two coordinate directions.

15. In electrical stock removal apparatus of a character in which electric discharges are generated across an ionizable fluid filled gap formed between cutting tool and workpiece electrodes so as to cause stock to be removed from the workpiece electrode comprising a rotating driver, an offset element revolvable by the driver about an axis eccentric to the axis of the driver, and means converting the rotary movement of the offset element into translatory movement of one of the electrodes, the rotary movement converting means including a bearing connection between the one [member] *electrode* and the offset element, a first slide mounting the one electrode [member] for movement in one direction and a second slide for mounting the one electrode for movement in another direction.

16. In electrical stock removal apparatus of a character in which electrical discharges are generated across an ionizable fluid filled gap formed between cutting tool and workpiece electrodes so as to cause stock to be eroded from the workpiece electrode comprising means feeding one of the electrodes relative to the other, a driver rotatable about the axis thereof, an offset element revolvable by the driver about an axis eccentric to the axis of rotation of the driver, means altering the eccentricity of the offset element relative to the driver, means converting the rotary movement of the driver into translatory movement of one of the electrodes and means coordinating the operation of the altering means and the feeding means so as to machine according to a certain scheme, the rotary movement converting means including a revolvable connection between the offset element and the one electrode and means slidably mounting the one electrode for movement in coordinate directions.

17. In electrical stock removal apparatus of the character in which electrical discharges are generated across an ionizable fluid filled gap formed between cutting and workpiece electrodes so as to cause stock to be eroded from the workpiece electrode comprising means feeding the electrodes relative to each other, a driver revolvable about the axis thereof, means converting rotary movement of the driver into translatory movement of one of the electrodes, the translatory movement being in a plane transverse to the direction of relative movement between the electrodes, and means synchronizing the operation of the feeding means and the rotation of the driver so as to cause stock to be removed from the workpiece according to a certain scheme.

18. In electrical stock removal apparatus of the character in which electrical discharges are generated across an ionizable fluid filled gap formed between cutting and workpiece electrodes so as to erode stock from the workpiece electrode comprising means feeding the electrodes relative to each other, a rotating driver, means converting rotary movement of the driver into translatory movement of one of the electrodes, the translatory movement being in a plane transverse to the direction of relative movement between the electrodes, means altering th extent of translatory movement of the one electrode, and means coordinating the operation of the feeding means with the operation of the altering means so as to cause stock to be removed from the workpiece electrode in accordance with a certain scheme.

19. In electrical stock removal apparatus of the character in which electrical discharges are generated across an ionizable fluid filled gap formed between cutting tool and workpiece electrodes so as to cause stock to be eroded from the workpiece electrode comprising means feeding the electrodes relative to each other, a driver revolvable about the axis thereof, an offset element revolvable by the driver about an axis eccentric to the axis of rotation of the driver, means adjusting the eccentricity of the offset element relative to the axis of rotation of the driver, means converting the rotary movement of the offset element into translatory movement of one of the electrodes so as to cause the workpiece to be machined according to a certain scheme, the rotary movement converting means including a bearing connecting the offset element and the one electrode and means slidably mounting the one electrode for movement in coordinate directions, and means coordinating the adjustment of the eccentricity of the offset element with the operation of the feeding means and the rotation of the driver so as to cause material to be removed from the workpiece electrode according to a certain scheme.

*20. The method of producing a desired shape in or on a work member by electrical erosion, the work member being formed of electrically conducting material, comprising the steps of: positioning a shaped electrode member with respect to the work member so that one of said members encircles a portion of the other member and with the shaped portion of the electrode member adjacent the portion of the work member to be shaped, causing relative orbital movement between the electrode member and the work member without relative rotation or axial feed, and causing an electric erosion current to flow between the electrode member and the work member.*

*21. The method of claim 20 wherein the electrode member is shaped on its outer surface to form the desired shape on an inner surface of the work member.*

*22. The method of claim 20 wherein the electrode member is shaped on an inner surface to form the desired shape on an outer surface of the work member.*

*23. Apparatus for relatively moving an electrode element and a workpiece element for electrically shaping the latter, comprising separate, approximately coaxial holding means for each of said elements, a first one of said holding means and its related one of said elements being linearly movable axially and a second one of said holding means and its related one of said elements being restrained against such linear, axial movement, one of said holding means comprising a first body member restrained against movement transversely of the line of said linear movement, a second body member coaxially aligned with said first body member, a connection between said body members restraining them against relative rotary movement about said line and against relative movement in parallelism with said line, and actuating means for successively moving said second body member translationally to angularly spaced points in a plane perpendicular to said line whereby to enable said electrode element to form, on said workpiece element, a surface substantially uniformly spaced from directly opposed surface portions of said electrode element.*

References Cited

The following references, cited by the Examiner, are of record in the patented file of this patent or the original patent.

UNITED STATES PATENTS

| | | | |
|---|---|---|---|
| 900,313 | 10/1908 | Schutz | 74—86 |
| 1,188,903 | 6/1916 | Cornwall | 74—87 |
| 2,580,716 | 1/1952 | Balamuth. | |
| 2,766,364 | 10/1956 | Higgins et al. | |
| 2,773,968 | 12/1956 | Martellotti et al. | |
| 2,794,110 | 5/1957 | Griffith. | |
| 2,385,665 | 9/1945 | Warwick. | |
| 2,773,968 | 12/1956 | Martellotti et al. | |

RALPH F. STAUBLY, Primary Examiner

U.S. Cl. X.R.

51—60; 204—143

PO-1050
(5/69)

UNITED STATES PATENT OFFICE
CERTIFICATE OF CORRECTION

Patent No. Re. 26,970 Dated October 20, 1970

Inventor(s) Robert F. Bentley and Sam V. Simonetti

It is certified that error appears in the above-identified patent and that said Letters Patent are hereby corrected as shown below:

In Column 2, line 71, change "is" (first occurrence) to -- it --.

In Column 7, Claim 17, line 10, after "workpiece" insert -- electrode --; Claim 18, line 21, after "th" insert the letter -- e --.

Signed and sealed this 27th day of April 1971.

(SEAL)
Attest:

EDWARD M.FLETCHER,JR.
Attesting Officer

WILLIAM E. SCHUYLER, JR.
Commissioner of Patents